United States Patent
Clarkson et al.

(10) Patent No.: US 8,601,755 B2
(45) Date of Patent: Dec. 10, 2013

(54) SOLAR PANEL SUPPORTS

(75) Inventors: Brian Bruce Clarkson, Cobourg (CA);
Brian David Wood, Cobourg (CA)

(73) Assignee: 1541689 Ontario Inc., Cobourg (CA)

( * ) Notice: Subject to any disclaimer, the term of this patent is extended or adjusted under 35 U.S.C. 154(b) by 37 days.

(21) Appl. No.: 13/365,629

(22) Filed: Feb. 3, 2012

(65) Prior Publication Data
US 2012/0247540 A1   Oct. 4, 2012

Related U.S. Application Data

(60) Provisional application No. 61/468,207, filed on Mar. 28, 2011.

(51) Int. Cl.
*E04D 13/18* (2006.01)
*E04H 14/00* (2006.01)

(52) U.S. Cl.
USPC ...... 52/173.3; 136/251; 248/396; 248/346.03

(58) Field of Classification Search
USPC .......... 52/173.3; 136/244, 251; 248/371, 396, 248/346.01, 346.03
See application file for complete search history.

(56) References Cited

U.S. PATENT DOCUMENTS

| | | | |
|---|---|---|---|
| 4,392,009 A * | 7/1983 | Napoli ........................... | 136/251 |
| 4,461,279 A | 7/1984 | Gaden | |
| 4,636,577 A | 1/1987 | Peterpaul | |
| 5,706,617 A * | 1/1998 | Hirai et al. .................... | 52/173.3 |
| 6,105,316 A | 8/2000 | Bottger et al. | |
| 6,570,084 B2 | 5/2003 | Dinwoodie | |
| 6,809,251 B2 | 10/2004 | Dinwoodie | |
| 6,968,654 B2 | 11/2005 | Moulder et al. | |
| 7,434,362 B2 | 10/2008 | Liebendorfer | |
| 7,487,771 B1 | 2/2009 | Eiffert et al. | |
| 7,921,843 B1 * | 4/2011 | Rawlings ....................... | 126/623 |
| 8,336,277 B1 * | 12/2012 | Rego et al. .................... | 52/747.1 |
| 2004/0221886 A1 * | 11/2004 | Oono ............................. | 136/251 |
| 2005/0126621 A1 | 6/2005 | Dinwoodie et al. | |
| 2008/0087275 A1 | 4/2008 | Sade et al. | |
| 2008/0264470 A1 * | 10/2008 | Masuda et al. ................ | 136/251 |
| 2008/0315061 A1 * | 12/2008 | Fath .............................. | 248/510 |
| 2009/0194098 A1 | 8/2009 | Placer | |
| 2009/0266406 A1 | 10/2009 | Duke et al. | |
| 2009/0320908 A1 * | 12/2009 | Botkin et al. ................. | 136/251 |

FOREIGN PATENT DOCUMENTS

| | | |
|---|---|---|
| WO | WO-2007076519 A2 | 7/2007 |
| WO | WO-2007079382 A2 | 7/2007 |

* cited by examiner

*Primary Examiner* — Brian Glessner
*Assistant Examiner* — Brian D Mattei
(74) *Attorney, Agent, or Firm* — Gifford, Krass, Sprinkle, Anderson & Citkowski, P.C.; Douglas L. Wathen

(57) ABSTRACT

A system for supporting a plurality of solar panels includes elongated support members each having a first portion, a coextensive second portion, and a longitudinally extending mid portion between the first and second portions. The first and second portions each have a base for contacting a surface and an edge receiving area configured to receive an edge of a solar panel at a height above the base, with the heights placing one edge higher than the other. When installed, support members are disposed generally parallel to each other and spaced apart on a surface, with the edge receiving portions facing each other. The upper edge of a solar panel is received in the edge receiving area of the first portion of one of the support members and a lower edge of the solar panel is received in the edge receiving area of the second portion of the other support members.

30 Claims, 10 Drawing Sheets

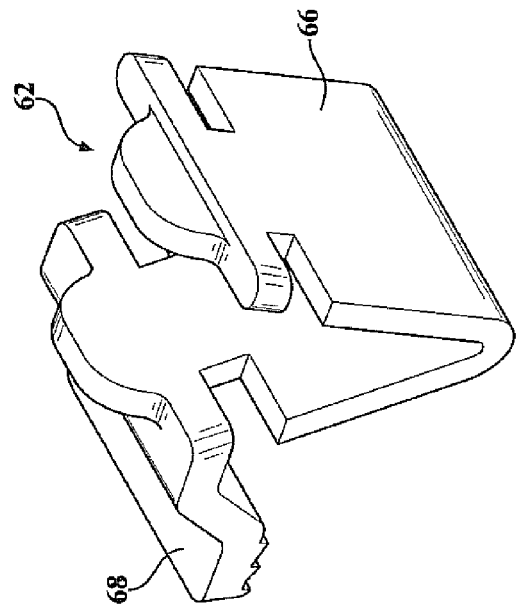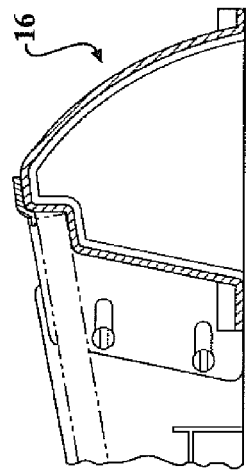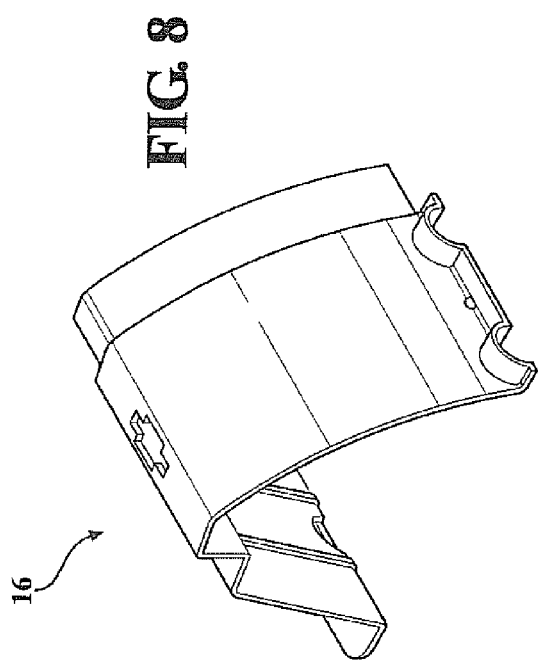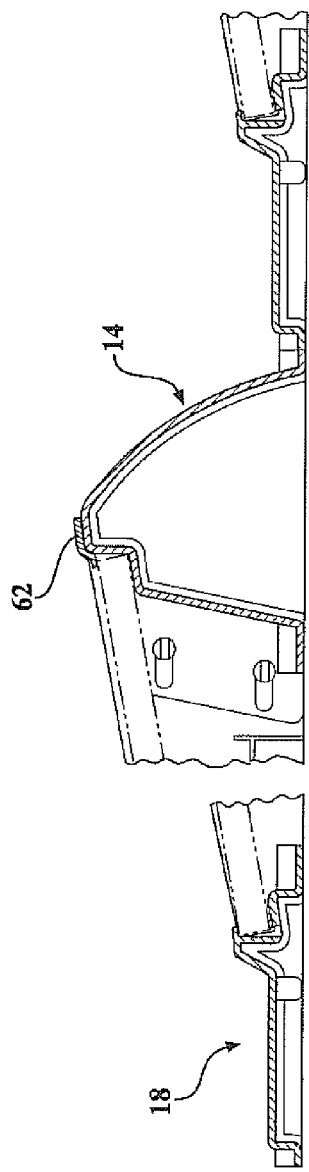

SOLAR PANEL SUPPORTS

REFERENCE TO RELATED APPLICATION

This Utility Patent Application claims priority to U.S. Provisional Patent Application Ser. No. 61/468,207, filed Mar. 28, 2011, the entire content of which is incorporated herein in its entirety.

BACKGROUND OF THE INVENTION

Solar panels are often installed in arrays or rows on the roof of a building. The panels should be supported at an angle appropriate for the location of the building. For example, in the northern part of the United States, the appropriate angle may be approximately 10 degrees with respect to horizontal. Where solar panels are installed on a flat roof of a building, it is desirable to tilt the panels at 10 degrees with respect to the roof. Other angles may be appropriate or desirable, depending on the location and application.

Solar panels are typically rectangular in shape but come in a variety of dimensions. For example, the length of some panels is often in the range of 1635-1660 millimeters while the width often varies from 980-1020 millimeters and the thickness often varies from 40-46 millimeters. A variety of solar panel support frames are available. Typically, these support frames form a frame around the entirety of the solar panel and have downwardly extending portions for contacting a support surface such as a roof. Often these frames also extend underneath the solar panel such that the overall frame is a large, generally continuous body requiring a lot of material to form. Additionally, different support frames must be provided to accommodate different sizes of panels.

Solar panels, when installed on a roof, are exposed to a variety of forces. One force is wind load that may act to move or lift the solar panel. There have been various attempts to provide solar panel support frames that counter this wind load. Existing solar panel mounting systems often require anchoring to the roof, which may require penetrating the roof membrane. This may lead to leaks, and may violate various insurance covenants.

There remains a need for improved solar panel supports.

SUMMARY OF THE INVENTION

The present invention provides a system for supporting a plurality of solar panels on a surface. The solar panels each have an upper edge, an opposed lower edge, and a pair of opposed side edges extending between the upper and lower edges. The solar panels are disposed in adjacent rows wherein the lower edge of one panel is adjacent the upper edge of another panel in an adjacent row. The system includes a plurality of elongated support members each having a first edge and an opposed second edge extending longitudinally between a pair of opposed ends. Each support member has an elongated first portion including the first edge and a coextensive elongated second portion including the second edge. Each support member also has a longitudinally extending mid portion between the first and second portions. The first portion of each support member has a base for contacting a surface and an edge receiving area configured to receive an upper edge of a solar panel at a first height above the base. The second portion has a base for contacting the surface and an edge receiving area configured to receive a lower edge of a solar panel at a second height above the base, the second height being less than the first height. The system has an installed configuration wherein a first one of the support members and a second one of the support members are disposed generally parallel to each other and spaced apart on the surface. These support members are positioned such that the first portion of one support member is directed toward the second elongated portion of the other. The upper edge of a solar panel is received in the edge receiving area of the first portion of one of the support members and a lower edge of the solar panel is received in the edge receiving area of the second portion of the other of the support members.

In some embodiments, the elongated support members are each formed as a unitary piece, and may be molded from a plastic material. In some versions, the elongated support members each form a generally continuous surface between the edge of the first portion and the edge of the second portion.

In some embodiments, at least a part of the mid portion of the support members is coplanar with the bases of the first and second portions such that each is supported on the surface in the installed configuration. In some versions, the mid portion has a generally horizontal upper surface defining a walking surface.

In some embodiments, the first portion of each support member includes a first wall forming a generally continuous surface between the base and the edge receiving area. In further embodiments, the first portion includes a second wall forming a generally continuous surface between the mid portion and the edge receiving area. The second wall may be a curved wall.

In some embodiments, one of the edge receiving areas includes a ledge for receiving a lower surface of an edge of a solar panel and a plurality of tabs for extending above an upper surface of an edge of a solar panel.

The system may further include a plurality of end pieces, with each end piece being configured to cooperate with one of the ends of a support member so as to close off the end. In some versions, one of the ends of each of the support members has a closed profile and the other of the ends cooperates with one of the end pieces.

In some embodiments, a plurality of the support members in the installed configuration are disposed with the end of one support member overlapping and connecting to the end of another support member so as to provide a generally continuous support member assembly.

The system may further include a lower support member having a base for contacting the surface and an edge receiving area configured to receive a lower edge of a solar panel at the second height above the base. This lower support member does not having any additional edge receiving area. The system in the installed configuration supports a plurality of rows of solar panels, with the lower support member supporting the lower edge of solar panels in a last row of the solar panels. The system may also further include an upper support member having a base for contacting the surface and an edge receiving area configured to receive an upper edge of a solar panel at the first height above the base. This upper support member does not having any additional edge receiving area. The system in the installed configuration supports a plurality of rows of solar panels, with the upper support member supporting the upper edge of solar panels in a first row of the solar panels.

In some embodiments, the first height and the second height are selected such that a solar panel is supported at approximately 10 degrees with respect to the surface.

According to an additional embodiment of the present invention, a system is provided for supporting a plurality of solar panels on a surface. The solar panels each have an upper edge, an opposed lower edge, and a pair of opposed side edges extending between the upper and lower edges, and the solar panels are disposed in a row. An upper support member has a first edge and an opposed second edge extending longitudinally between a pair of opposed ends. The upper support member has a base for contacting a surface and an edge receiving area configured to receive an upper edge of a solar panel at a first height above the base. A lower support member has a first edge and an opposed second edge extending longitudinally between a pair of opposed ends. The lower support member has a base for contacting a surface and an edge receiving area configured to receive an upper edge of a solar panel at a second height above the base. The second height being less than the first height. The system has an installed configuration wherein an upper support member and a lower support member are disposed generally parallel to each other and spaced apart on the surface. The support members are positioned such that the edge receiving areas are directed toward each other. The upper edge of a solar panel is received in the edge receiving area of the upper support member and a lower edge of the solar panel is received in the edge receiving area of the lower support member.

In some versions, the support members are each formed as a unitary piece, and the support members may be molded from a plastic material.

In some embodiments, the support members each form a generally continuous surface between the opposed edges. The support members may each have a generally continuous first wall extending between the first edge of the support member and the edge receiving area and a generally continuous second wall extending between the second edge of the support member and the edge receiving area.

A method for supporting a plurality of solar panels on a surface, in accordance with the present invention, is also provided. The solar panels each having an upper edge, an opposed lower edge, and a pair of opposed side edges extending between the upper and lower edges. The solar panels are disposed in adjacent rows wherein the lower edge of one panel is adjacent the upper edge of another panel in an adjacent row. The method includes providing a plurality of elongated support members. The support members each have a first edge and an opposed second edge extending longitudinally between a pair of opposed ends. Each support member has an elongated first portion including the first edge and a coextensive elongated second portion including the second edge. Each support member further has a longitudinally extending mid portion between the first and second portions. The first portion of each support member has a base for contacting a surface and an edge receiving area configured to receive an upper edge of a solar panel at a first height above the base. The second portion of each support member has a base for contacting the surface and an edge receiving area configured to receive a lower edge of a solar panel at a second height above the base. The second height is less than the first height.

According to the method, a first one of the support members and a second one of the support members are disposed generally parallel to each other and spaced apart on the surface. The support members are positioned such that the first portion of the first one of the support members is directed toward the second portion of the second one of the support members. An upper edge of a solar panel is received in the edge receiving area of the first portion of the first one of the support members and a lower edge of the solar panel is received in the edge receiving area of the second portion of the second one of the support members.

BRIEF DESCRIPTION OF DRAWINGS

FIG. 8 is a perspective view of a portion of one of the support members in accordance with the present invention;

FIG. 9 is a cross-sectional view of the supports and panels of FIG. 1, taken along lines 9-9;

FIG. 11 is a perspective view of a clip for use with the solar panel supports;

DETAILED DESCRIPTION OF THE INVENTION

Figure 1:
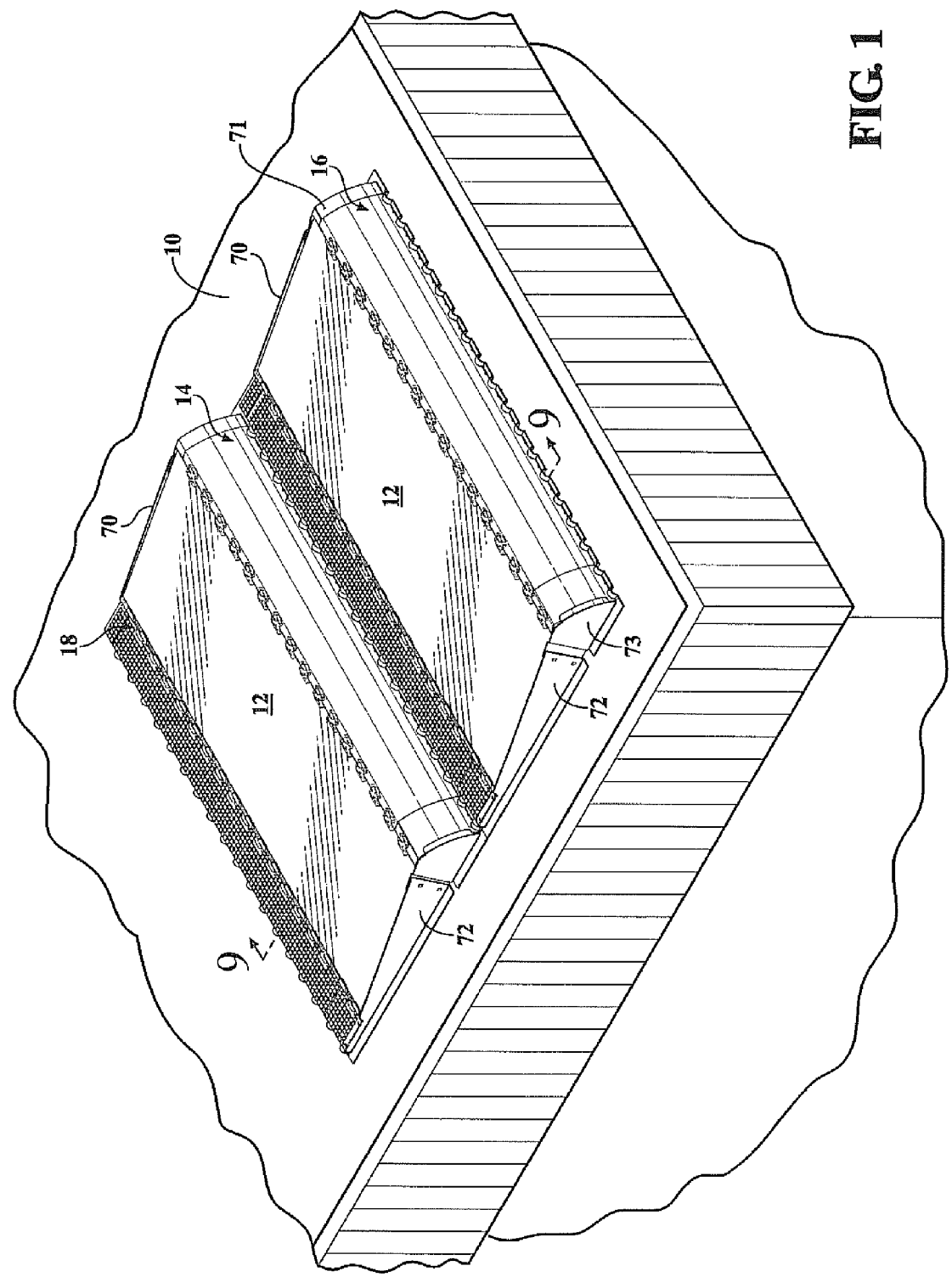
FIG. 1 is a perspective view of solar panel support members in accordance with an embodiment of the present invention supporting solar panels on a flat roof.

The present invention provides a system and method for supporting a plurality of solar panels on a surface, such as a roof of a building. FIG. 1 illustrates a building roof 10 with solar panels 12 supported by embodiments of solar panel supports in accordance with the present invention. An embodiment of a support member is shown at 14. As shown, the support member 14 supports a lower edge of one solar panel and also supports an upper edge of another solar panel in an adjacent row. Further embodiments of support members that may form part of the present invention are shown at 16 and 18. The support member 16 supports only the upper edge of a solar panel and does not include a portion designed to support the lower edge of an adjacent panel. The support member 16 may be called an upper support member. The support member 18 is configured to support a lower edge of a solar panel and is not configured to support an upper edge of an adjacent panel. The support member 18 may be called a lower support member. Unlike some solar panel support frames, the individual support members of the present invention do not completely surround a solar panel. The individual support members do not extend between the upper and lower edges of a single solar panel but are instead positioned in a spaced apart configuration such that a pair of support members cooperates to support a single solar panel. This allows support members in accordance with the present invention to accommodate variations in length and width in solar panels and also reduces the amount of material required to form the support members.

Figure 2:
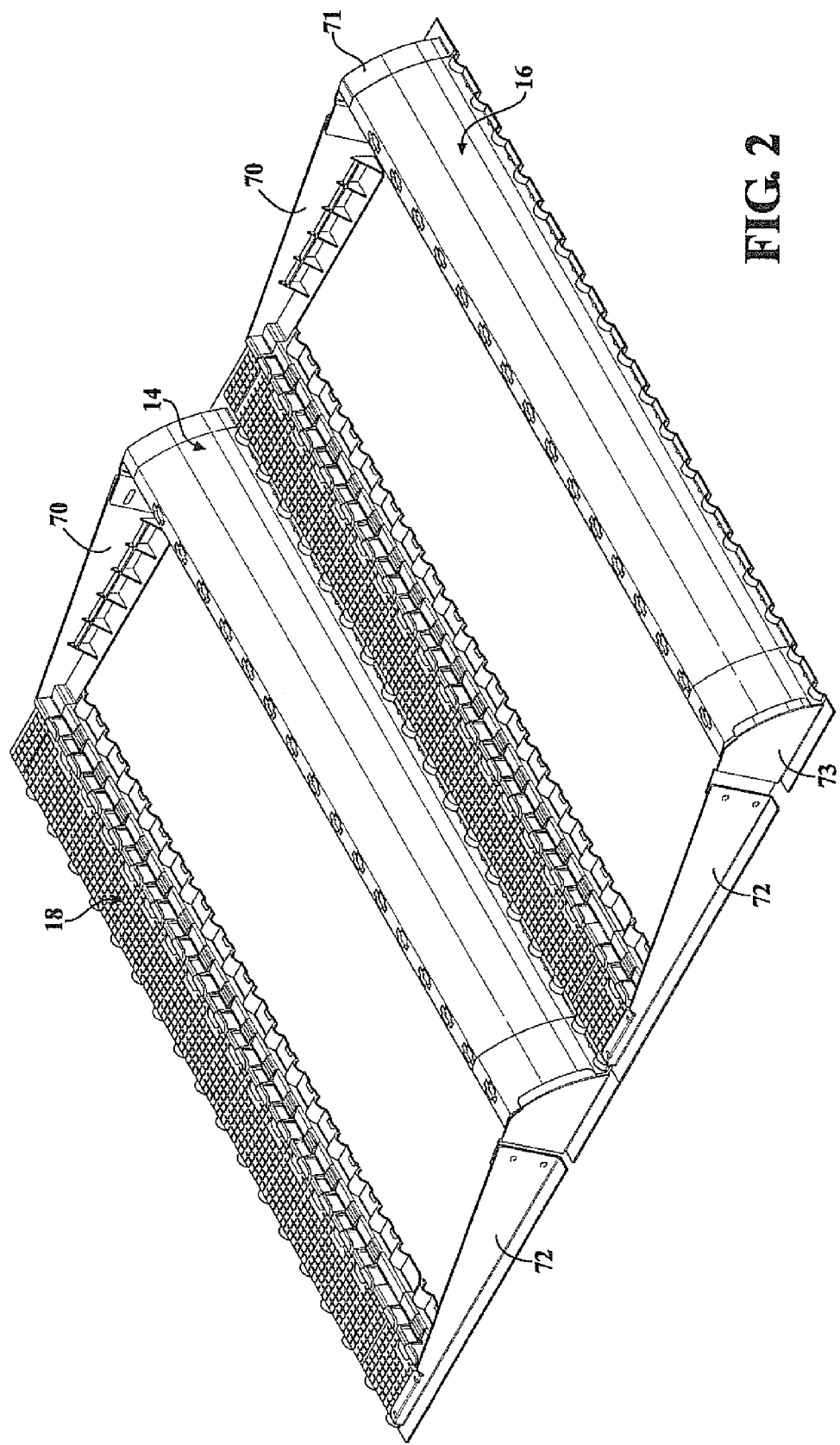
FIG. 2 is a perspective view similar to FIG. 1 with the solar panels removed.
Figure 3:
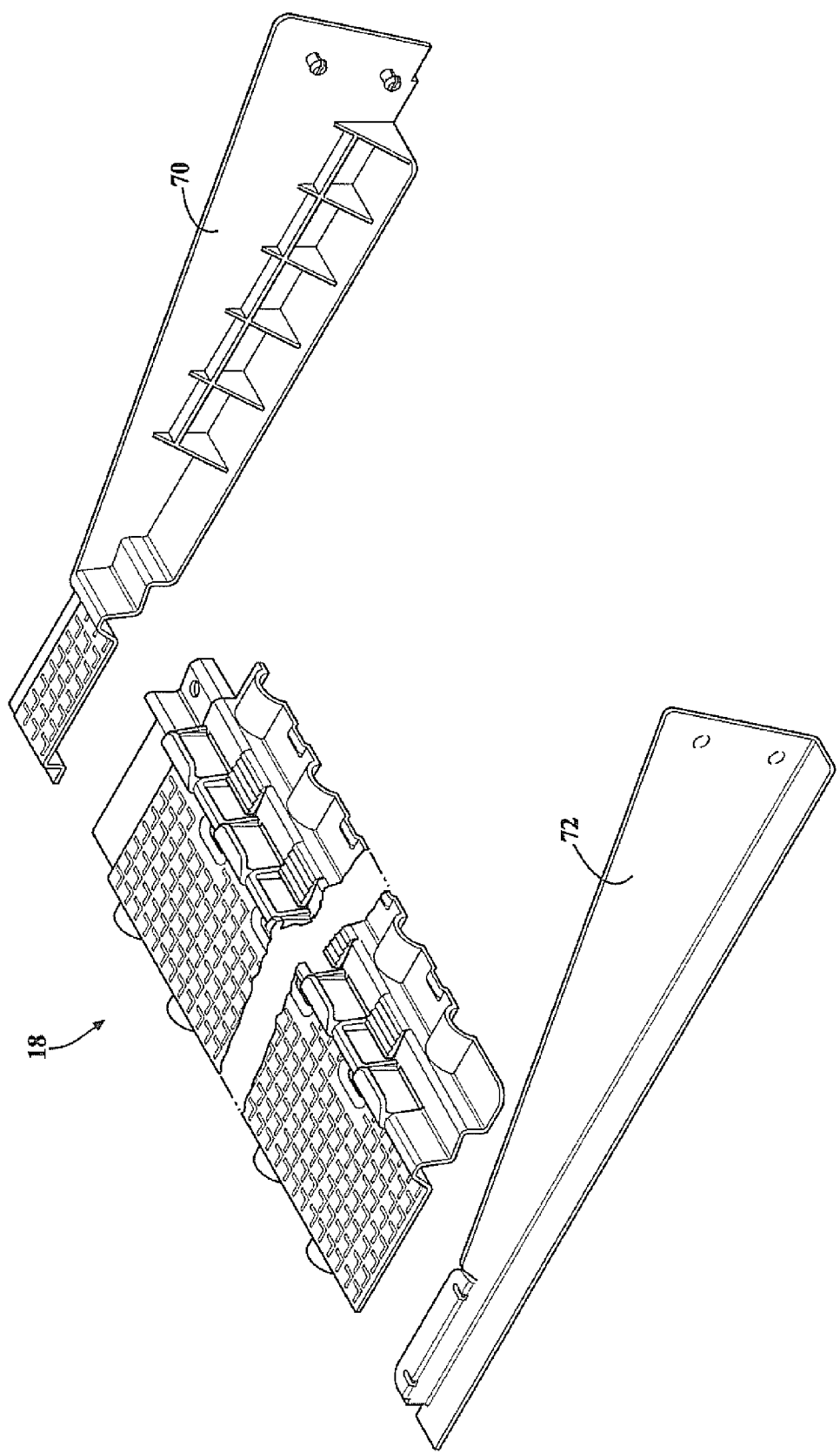
FIG. 3 is a perspective view of some of the support members of FIGS. 1 and 2 with the members separated to show details.
Figure 4:
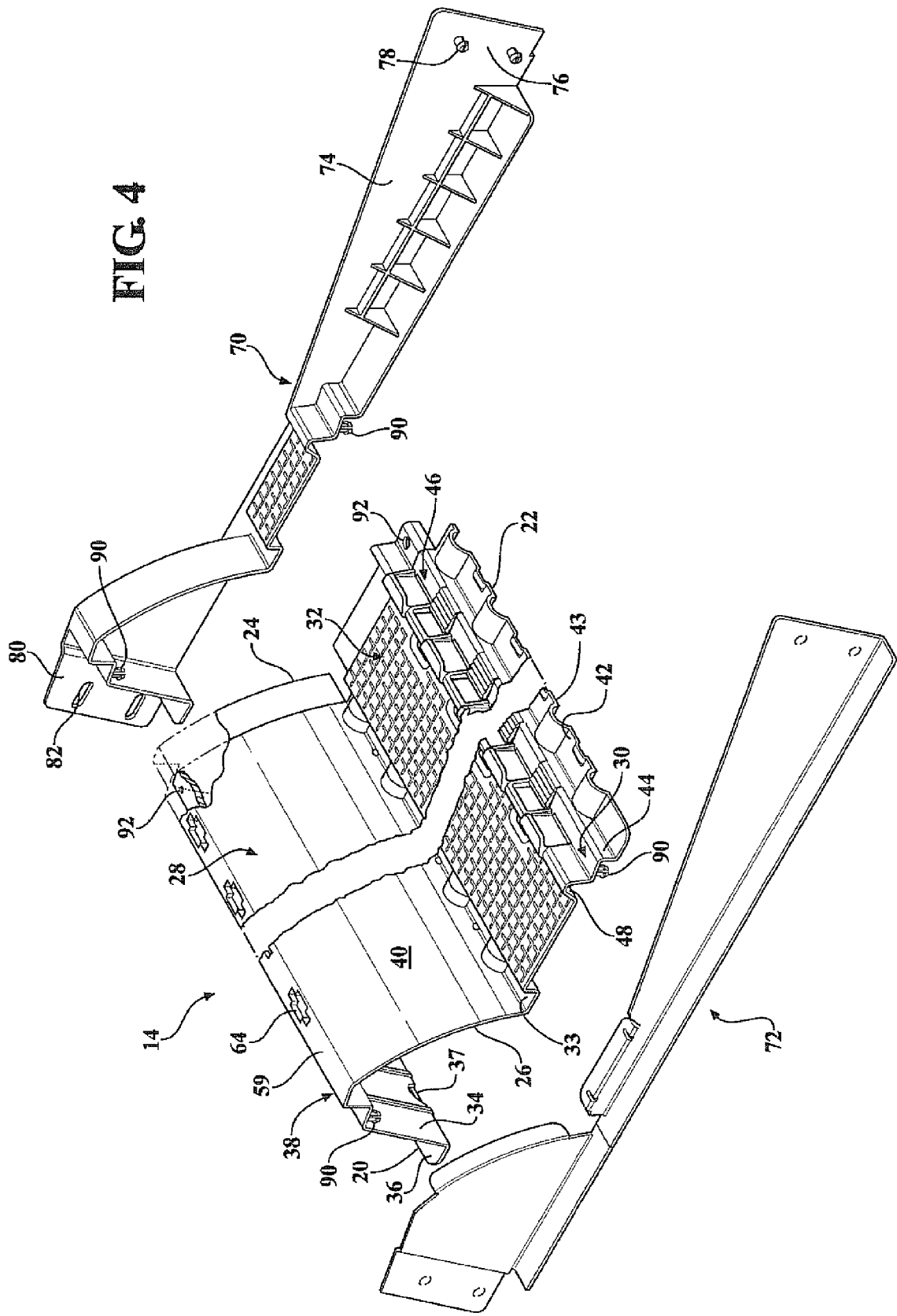
FIG. 4 is a perspective view of some of the support members of FIGS. 1 and 2 with the members separated to show details.
Figure 5:
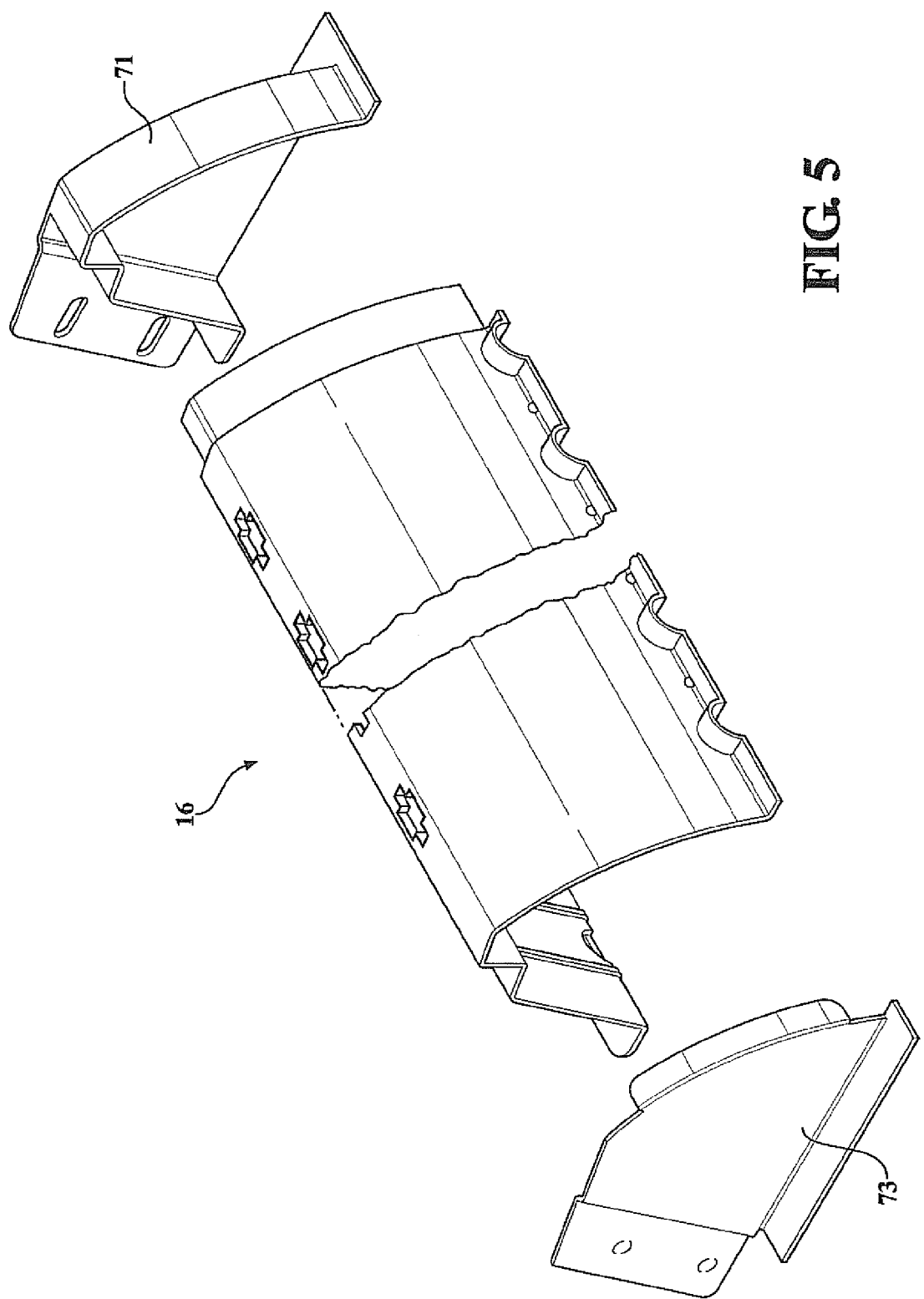
FIG. 5 is a perspective view of some of the support members of FIGS. 1 and 2 with the members separated to show details.
Figure 6:
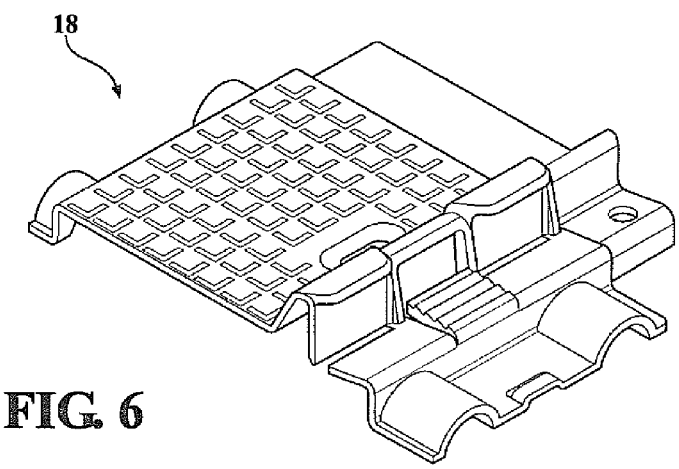
FIG. 6 is a perspective view of a portion of one of the support members in accordance with the present invention.
Figure 7:
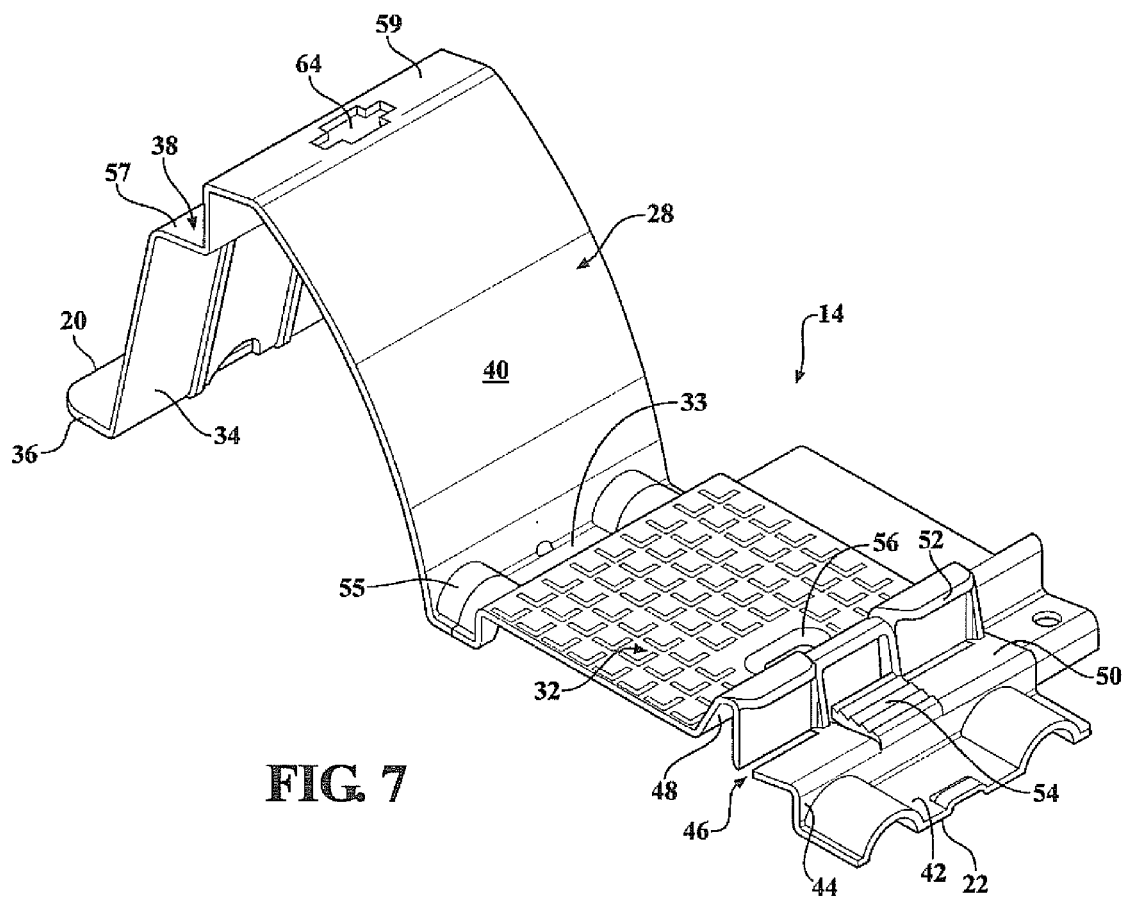
FIG. 7 is a perspective view of a portion of one of the support members in accordance with the present invention.

FIG. 2 illustrates the support members 14, 16 and 18 without the solar panels. FIGS. 1 and 2 also show end pieces 70 and 72, which may be used as part of the system, and end caps 71 and 73, which may be used in some versions. FIGS. 3, 4 and 5 provide more detailed views of the support members 18, 14 and 16, respectively, along with the end pieces 70 and 72 or end caps 71 and 73. FIGS. 6, 7 and 8 provide additional detailed views of portions of the support members 18, 14 and 16, respectively. FIG. 9 provides a cross-sectional view of the system supporting the panels of FIG. 1, taken along lines 9-9.

Figure 12:
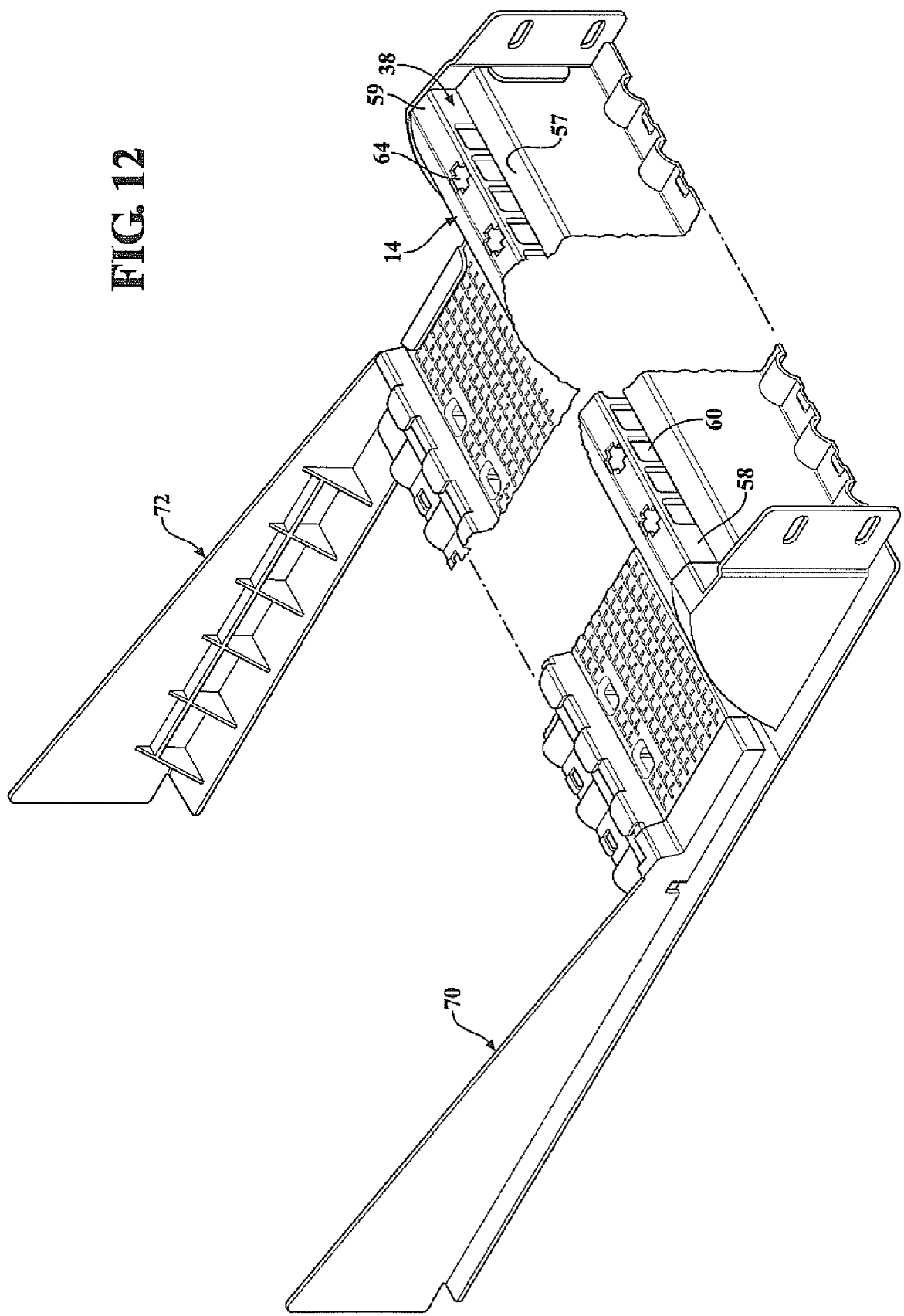
FIG. 12 is a perspective view of the solar support members of FIG. 4 from the opposite direction.
Figure 13:
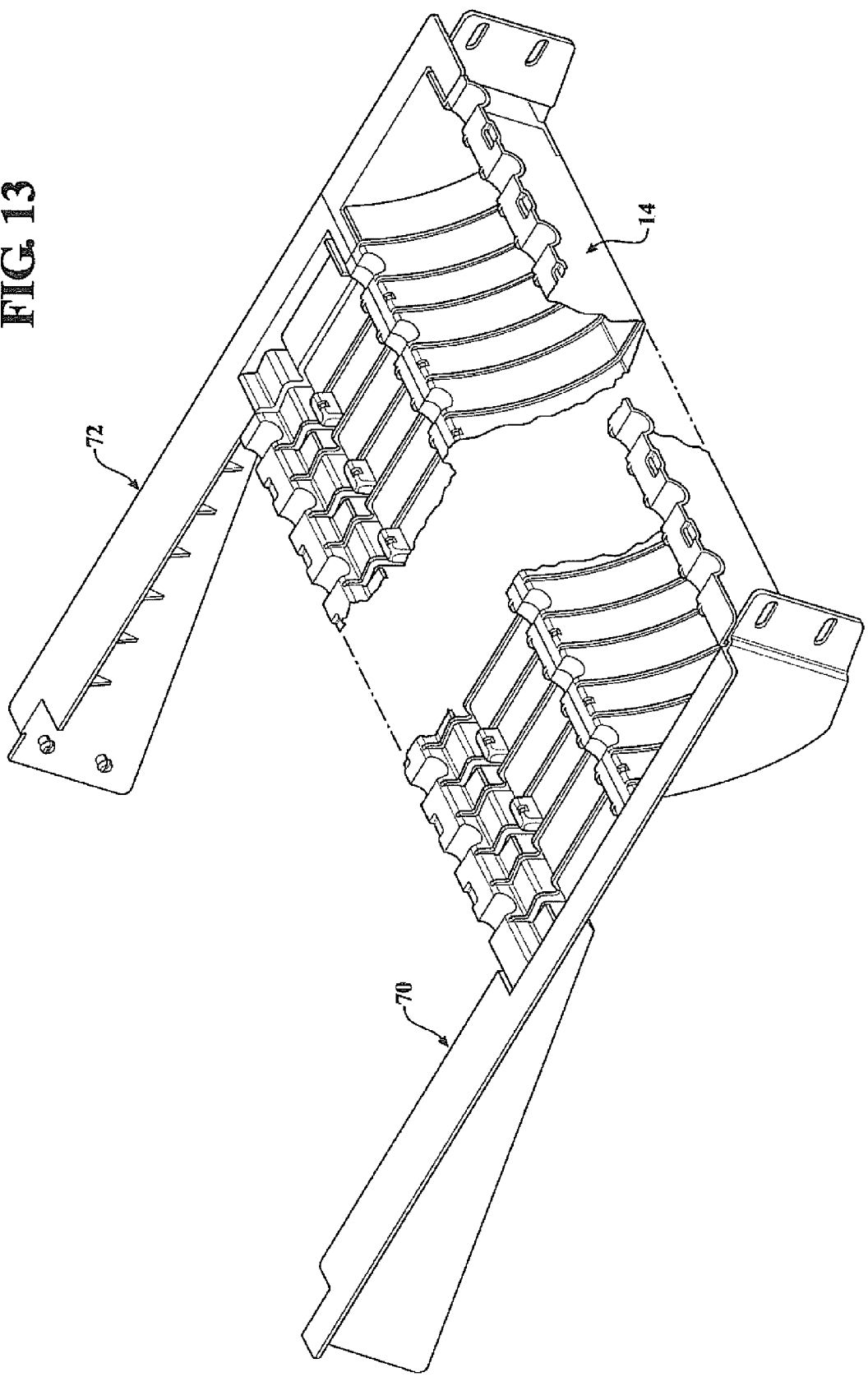
FIG. 13 is a bottom perspective view of some of the solar support members.

FIG. 12 provides a perspective view of the support member 14 and end pieces 70 and 72, from the opposite direction than in FIG. 4. FIG. 13 provides a view of the underside of the support member 14 and end pieces 70 and 72.

Referring now to FIGS. 4 and 7, the support member 14 will be described in more detail. The support member 14 is an elongated body of material, preferably unitarily formed or molded from a plastic material. Each of the members may also be made out of other materials, as will be clear to those of skill in the art. The elongated support member 14 includes a first edge 20 and an opposed second edge 22 that extend longitudinally between a pair of opposed ends 24 and 26. The support member 14 is generally divided into three portions. A first portion 28 is configured to support an upper edge of a solar panel and a second portion 30 is configured to support a lower edge of a solar panel in an adjacent row. A third or mid portion 32 extends longitudinally between the first portion 28 and second portion 30. In the illustrated embodiment, mid portion 32 links the first portion 28 and second portion 30 and provides a walkway between the first and second portions. Alternatively, the mid portion may be configured differently than shown, such as being narrower, being wider, or just being a dividing line or area between the first and second portions without a width of its own. In the illustrated embodiment, the mid portion 32 has a textured upper surface and is configured to be walked on by an installer or maintenance person.

The first portion 28 of the support member 14 includes the first edge 20 and a first wall 34 that extends upwardly from a base 36 to an edge receiving area 38 configured to receive the upper edge of the solar panel. The base 36 includes the edge 20 and is configured to contact the support surface, such as the roof. In the illustrated embodiment, the base 36 has half-pipe shaped raised areas 37 that allow for passage of wiring, and may also allow for the passage of water and air. As shown, the wall 34 is a generally continuous closed surface and may have reinforcing ribs or other features, as necessary. The term "generally continuous" is used herein to encompass the illustrated configuration as well as to allow for some openings for the passage of wiring, water or air. The first portion further includes a second wall 40 that extends generally continuously between the edge support area 38 and the mid portion 32. In the illustrated embodiment, this wall 40 is curved outwardly. The shape of the wall 40 may be chosen so as to counteract the force of the wind passing over a solar panel array.

The second portion 30 also has a base 42, an upwardly extending wall 44, and an edge receiving area 46. As shown, the edge receiving area 46 is disposed at a height that is much lower than the edge receiving area 38. In the illustrated embodiment, the base 42 has half-pipe shaped raised areas 43 that allows for passage of wiring, and may allow the passage of water and air. A second wall 48 extends generally continuously between the edge receiving area 46 and mid portion 32. Referring to FIG. 7, the edge receiving area 46 may be said to have a ledge 50 for supporting the lower surface of a solar panel and a plurality of tabs 52 for passing over an upper surface of the solar panel. Adjustment elements 54 may also be provided for accommodating variations in thickness of a solar panel edge.

The third or mid portion 32 extends generally continuously between the wall 40 of the first portion 28 and the wall 48 of the second portion 30. A base or transition area 33 may be provided where the mid portion joins the wall 40. This base or transition area 33 may have half-pipe shaped raised areas 55 for the passage of wiring, and may allow the passage of water or air. The mid portion 32 may also have support elements or feet 56 for supporting the upper surface of the mid portion 32. The base 33 and support elements or feet 56 are configured to contact the surface of the roof.

The edge receiving area 38 of the first portion 28 may be configured like the edge receiving area 46 of the second portion. However, in the illustrated embodiment it is configured differently. Referring to FIG. 12, the edge receiving area 38 will be described in more detail. It may be said to have a ledge 57 for supporting the lower surface of the solar panel. An upwardly extending portion 58 of the edge receiving area 38 extends from the ledge 57 to a top surface 59. In the illustrated embodiment, the ledge 57 and top surface 59 are generally horizontal, while the upwardly extending portion 58 is generally vertical. As shown, a plurality of openings 60 may be provided in the upwardly extending portion 58. These allow air pressure to equalize between the area below the support member 14 and the area above it. This helps to prevent lift from developing as air flows across the array. Referring now to FIG. 11, a clip 62 is shown. In the illustrated embodiment, clips 62 engage openings 64 in the top surface 59 of the first portion 28 and extend above the upper surface of the solar panel, thereby retaining it in place. The clips may be removed to lift and service or remove an individual panel. As shown, the clips 62 have an engagement portion 66 for engaging the openings 64 and a retaining portion 68 that extends above the solar panel. As will be clear to those of skill in the art, the clips may take other forms, such as having a different shape or engagement approach, including being a twist-lock type. Also, a clip system may be used in place of the tabs in the edge receiving area 46. The solar panels that are supported by the supports and retained thereon, such as by the clips 62, may have their own frame defining the edges of the panel or may be "frameless" such that the clip presses directly on the glass of the panel. Optionally, the system may further include strips or straps that support and protect the glass, such as running between the glass and the clips or below the panel and above the support ledge. Other approaches may also be used.

According to some embodiments of the present invention, support members 14 are disposed on a surface such that they are parallel to one another and spaced apart. The first portion of one support member faces the second portion of the other so that the support members cooperate to support the upper and lower edges of a solar panel. This may be repeated so as to provide support for multiple rows of solar panels. In some embodiments, the mid portion 32 is configured so as to allow the support member to be cut or split into two pieces so as to be used to provide the first and last row of supports. Alternatively, the supports may be used without splitting but with the unused half of the support member remaining intact.

In further embodiments, support members 16 and/or 18 may be provided to support the outer edges of the first and last row of solar panels. As shown in the drawings, the support member 16 is equivalent to the first portion 28 of the support member 14. The support member 18 is equivalent to the second portion 30 and mid portion 32, combined. In further embodiments, support members such as 16 and 18 may be provided and may be joined together so as to form a support member with the configuration of the support member 14.

Referring again to FIG. 4, end pieces 70 and/or 72 may be provided for closing the ends of the support member 14 and/or interconnecting a support member supporting the lower end of a solar panel with a support member supporting the upper end. Equivalent end caps may be provided for the support members 16 and 18. End caps 71 and 73 are shown in FIGS. 1, 2 and 5.

As shown, end piece 70 has a side portion 74 that is designed to extend along or under the side of a solar panel at the end of an array and to interconnect with another side member at the upper end of the solar panel. The side portion 74 terminates in a flange 76 with connecting elements 78. A corresponding flange 80 extends in the opposite direction from the end piece 70 and defines an opposite edge from the flange 76. The flange 80 has openings 82 defined therein for interconnecting with the connecting elements 78 of the next end piece 70 along the edge of the array. The openings 82 and connecting elements 78 allow some adjustment in the spacing between rows of support members to as to accommodate different size solar panels. As an alternative to the illustrated end pieces, the support members may be formed with one end closed and the other end open so that only a single end piece is required. For example, the end 26 of support member 14 may be closed off such that end piece 72 is not needed. As another alternative, the end pieces 70 and 72 may be combined into a piece that may be used on either side of a panel. In one version, a combined end piece would have the shape of end piece 70 on ones side and the shape of end piece 72 on its opposite side such that it can be used to close off either end of the support members. Put another way, the combined end piece would be generally T-shaped in cross section with flanges extending from either side to provide the function of both end piece 70 and end piece 72.

In preferred embodiments of the present invention, the support members 14, 16 and 18 are longer that the corresponding dimension of a single solar panel. Preferably, their length is chosen so as to efficiently fill a truck or other shipping container, with the support members nested into an efficient stack. When installed, multiple support members are arranged end to end, with them snapping together. Referring to FIG. 4, snap elements 90 are shown adjacent one end of the support member 14. Corresponding receiving openings 92 are provided at the opposite end. The end pieces 70 and 72 may also include these features. The interconnection of the support members allows wind loads to be shared. Preferably, the support system disclosed herein is self supporting and does not require anchoring to the roof, thereby avoiding penetrating the roof membrane. The interconnection of the support members helps with this feature. The lengths of the support members may also be chosen such that the lengths are not a multiple of the solar panel lengths, so that the interconnection of two support members does not occur where two solar panels meet. In one example, the support members are eight foot long and the solar panels are 65 inches long. When assembling an array, the last support member in each row will typically be cut to length where the last solar panel ends. The end is then closed with an end piece.

The support members preferably stack and nest for efficient shipping. This combined with the fact that the support members are smaller than support frames that surround a panel makes for dramatically improved shipping density.

Figure 10:
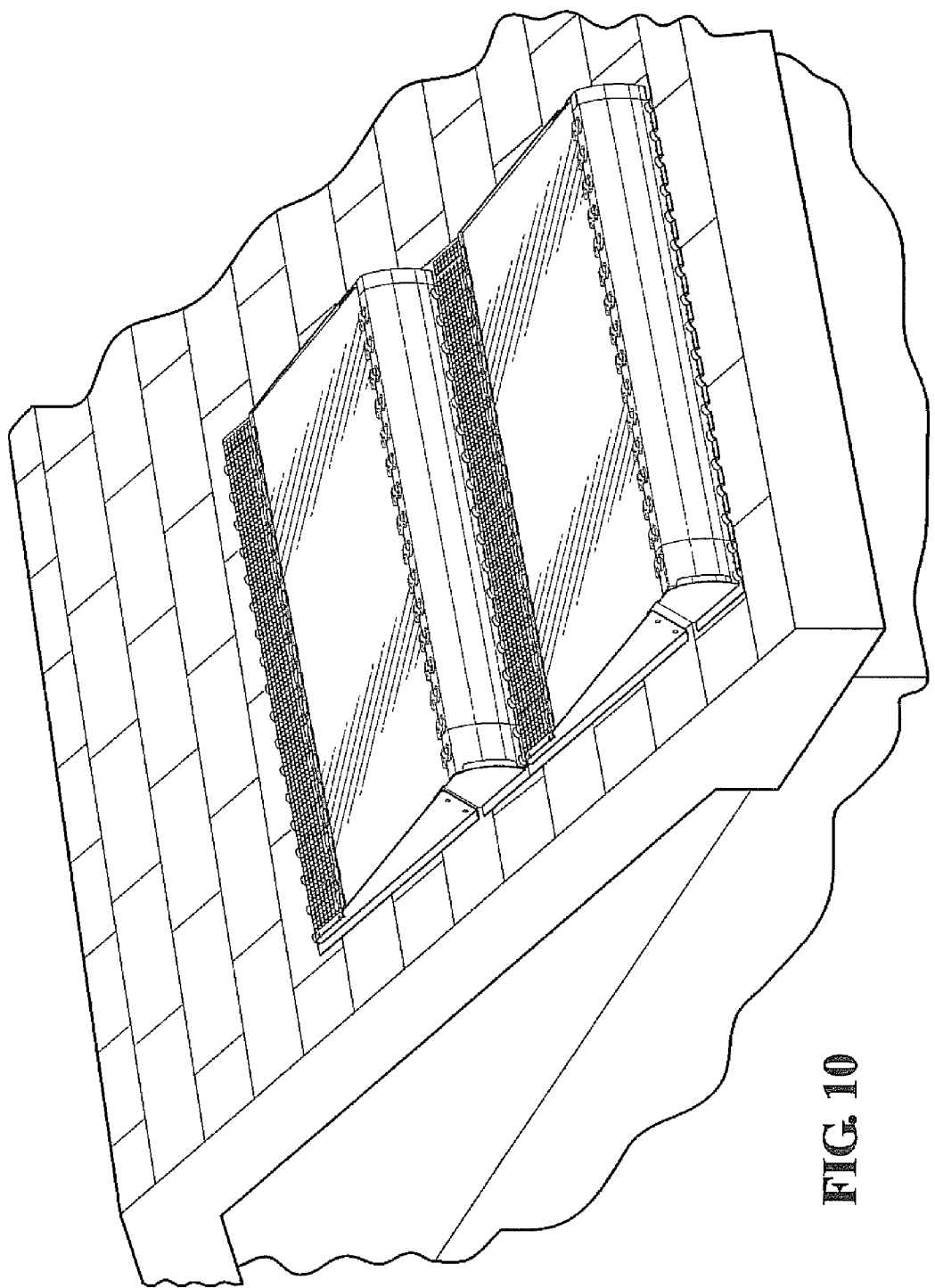
FIG. 10 is a perspective view of solar panel support members in accordance with an embodiment of the present invention supporting solar panels on an angled roof.

As will be clear to those of skill in the art, the support members may be configured to provide support at different angles than illustrated, depending on the application. Embodiments of the present invention, or modified embodiments thereof, may also be useful on a sloped roof, such as shown in FIG. 10.

As will be clear to those of skill in the art, the herein illustrated and discussed embodiments of the present invention may be altered in various ways without departing from the scope or teaching of the present invention. It is the following claims, including all equivalents, which define the scope of the invention.

The invention claimed is:

1. A system for supporting a plurality of solar panels on a surface, the solar panels each having an upper edge, an opposed lower edge, and a pair of opposed side edges extending between the upper and lower edges, the solar panels being disposed in adjacent rows wherein the lower edge of one panel is adjacent the upper edge of another panel in an adjacent row, the system comprising:

a plurality of elongated support members each having a first edge and an opposed second edge extending longitudinally between a pair of opposed ends, each support member having an elongated first portion including the first edge and a coextensive elongated second portion including the second edge, each support member further having a longitudinally extending mid portion extending between and interconnecting the first and second portions;

the first portion having a base for contacting a surface and an edge receiving area configured to receive an upper edge of a solar panel at a first height above the base; and the second portion having a base for contacting the surface and an edge receiving area configured to receive a lower edge of a solar panel at a second height above the base, the second height being less than the first height;

the mid portion horizontally spacing the first portion from the second portion and having an exposed generally upwardly facing surface between the first and second portions, the generally upwardly facing surface being at a height offset from the edge receiving area of the first portion;

the system having an installed configuration wherein a first one of the support members and a second one of the support members are disposed generally parallel to each other and spaced apart on the surface, the support members being positioned such that the first portion of the first one of the support members is directed toward the second elongated portion of the second one of the support members, the upper edge of a solar panel being received in the edge receiving area of the first portion of the first one of the support members and a lower edge of the solar panel being received in the edge receiving area of the second portion of the second one of the support members.

2. The system of claim 1, wherein:
the elongated support members are each formed as a unitary piece.

3. The system of claim 2, wherein:
the elongated support members are each molded from a plastic material.

4. The system of claim 2, wherein:
the elongated support members each form a generally continuous surface between the edge of the first portion and the edge of the second portion.

5. The system of claim 1, wherein:
the first portion includes a first wall forming a generally continuous surface between the base and the edge receiving area.

6. The system of claim 1, wherein:
the first portion includes a second wall forming a generally continuous surface between the mid portion and the edge receiving area.

7. The system of claim 6, wherein:
the second wall is a curved wall.

8. The system of claim 1, wherein:
one of the edge receiving areas includes a ledge for receiving a lower surface of an edge of a solar panel and a plurality of tabs for extending above an upper surface of an edge of a solar panel.

9. The system of claim 1, further comprising:
a plurality of end pieces, each end piece configured to cooperate with one of the ends of a support member so as to close off the end.

10. The system of claim 1, wherein:
each support member having a snap element adjacent one end and a receiving opening at an opposite end for connecting to the end of another support member so as to provide a generally continuous support member assembly.

11. The system of claim 1, further comprising:
a lower support member having a base for contacting the surface and an edge receiving area configured to receive a lower edge of a solar panel at the second height above the base, the lower support member not having any additional edge receiving area;
the system in the installed configuration supporting a plurality of rows of solar panels, the lower support member supporting the lower edge of solar panels in a last row of the solar panels.

12. The system of claim 11, further comprising:
an upper support member having a base for contacting the surface and an edge receiving area configured to receive an upper edge of a solar panel at the first height above the base, the upper support member not having any additional edge receiving area;
the system in the installed configuration supporting a plurality of rows of solar panels, the upper support member supporting the upper edge of solar panels in a first row of the solar panels.

13. The system of claim 1, wherein:
the first height and the second height are selected such that a solar panel is supported at approximately 10 degrees with respect to the surface.

14. The system of claim 1, wherein:
the system is for supporting the solar panels at an angle on a generally flat roof surface; and
the second height is significantly lower than the first height such that the solar panel is angled with respect to the roof surface under the support members.

15. A system for supporting a plurality of solar panels on a surface, the solar panels each having an upper edge, an opposed lower edge, and a pair of opposed side edges extending between the upper and lower edges, the solar panels being disposed in adjacent rows wherein the lower edge of one panel is adjacent the upper edge of another panel in an adjacent row, the system comprising:
a plurality of elongated support members each having a first edge and an opposed second edge extending longitudinally between a pair of opposed ends, each support member having an elongated first portion including the first edge and a coextensive elongated second portion including the second edge, each support member further having a longitudinally extending mid portion between the first and second portions;
the first portion having a base for contacting a surface and an edge receiving area configured to receive an upper edge of a solar panel at a first height above the base; and
the second portion having a base for contacting the surface and an edge receiving area configured to receive a lower edge of a solar panel at a second height above the base, the second height being less than the first height;
at least a part of the mid portion being coplanar with the bases of the first and second portions such that each is supported on the surface in the installed configuration;
the system having an installed configuration wherein a first one of the support members and a second one of the support members are disposed generally parallel to each other and spaced apart on the surface, the support members being positioned such that the first portion of the first one of the support members is directed toward the second elongated portion of the second one of the support members, the upper edge of a solar panel being received in the edge receiving area of the first portion of the first one of the support members and a lower edge of the solar panel being received in the edge receiving area of the second portion of the second one of the support members.

16. The system of claim 15, wherein:
the elongated support members are each formed as a unitary piece and are each molded from a plastic material.

17. The system of claim 15, wherein:
the elongated support members each form a generally continuous surface between the edge of the first portion and the edge of the second portion;
the first portion includes a first wall forming a generally continuous surface between the base and the edge receiving area; and
the first portion includes a second wall forming a generally continuous surface between the mid portion and the edge receiving area, the second wall being a curved wall.

18. The system of claim 15, wherein:
one of the edge receiving areas includes a ledge for receiving a lower surface of an edge of a solar panel and a plurality of tabs for extending above an upper surface of an edge of a solar panel.

19. The system of claim 15, further comprising:
a plurality of end pieces, each end piece configured to cooperate with one of the ends of a support member so as to close off the end;
one or more lower support members each having a base for contacting the surface and an edge receiving area configured to receive a lower edge of a solar panel at the second height above the base, the lower support members not having any additional edge receiving area, the system in the installed configuration supporting a plurality of rows of solar panels, the lower support members supporting the lower edge of solar panels in a last row of the solar panels; and
one or more upper support members each having a base for contacting the surface and an edge receiving area configured to receive an upper edge of a solar panel at the first height above the base, the upper support member not having any additional edge receiving area, the system in the installed configuration supporting a plurality of rows of solar panels, the upper support member supporting the upper edge of solar panels in a first row of the solar panels.

20. The system of claim 15, wherein:
each support member having a snap element adjacent one end and a receiving opening at an opposite end for connecting to the end of another support member so as to provide a generally continuous support member assembly.

21. The system of claim 15, wherein:
the system is for supporting the solar panels at an angle on a generally flat roof surface; and
the second height is significantly lower than the first height such that the solar panel is angled with respect to the roof surface under the support members.

22. A system for supporting a plurality of solar panels on a surface, the solar panels each having an upper edge, an opposed lower edge, and a pair of opposed side edges extending between the upper and lower edges, the solar panels being disposed in adjacent rows wherein the lower edge of one panel is adjacent the upper edge of another panel in an adjacent row, the system comprising:

a plurality of elongated support members each having a first edge and an opposed second edge extending longitudinally between a pair of opposed ends, each support member having an elongated first portion including the first edge and a coextensive elongated second portion including the second edge, each support member further having a longitudinally extending mid portion between the first and second portions;

the first portion having a base for contacting a surface and an edge receiving area configured to receive an upper edge of a solar panel at a first height above the base; and the second portion having a base for contacting the surface and an edge receiving area configured to receive a lower edge of a solar panel at a second height above the base, the second height being less than the first height;

the mid portion having a generally horizontal upper surface defining a walking surface;

the system having an installed configuration wherein a first one of the support members and a second one of the support members are disposed generally parallel to each other and spaced apart on the surface, the support members being positioned such that the first portion of the first one of the support members is directed toward the second elongated portion of the second one of the support members, the upper edge of a solar panel being received in the edge receiving area of the first portion of the first one of the support members and a lower edge of the solar panel being received in the edge receiving area of the second portion of the second one of the support members.

23. The system of claim 22, wherein:
the elongated support members are each formed as a unitary piece and are each molded from a plastic material.

24. The system of claim 22, wherein:
the elongated support members each foil a generally continuous surface between the edge of the first portion and the edge of the second portion;
the first portion includes a first wall forming a generally continuous surface between the base and the edge receiving area; and
the first portion includes a second wall forming a generally continuous surface between the mid portion and the edge receiving area, the second wall being a curved wall.

25. The system of claim 22, wherein:
one of the edge receiving areas includes a ledge for receiving a lower surface of an edge of a solar panel and a plurality of tabs for extending above an upper surface of an edge of a solar panel.

26. The system of claim 22, further comprising:
a plurality of end pieces, each end piece configured to cooperate with one of the ends of a support member so as to close off the end;
one or more lower support members each having a base for contacting the surface and an edge receiving area configured to receive a lower edge of a solar panel at the second height above the base, the lower support members not having any additional edge receiving area, the system in the installed configuration supporting a plurality of rows of solar panels, the lower support members supporting the lower edge of solar panels in a last row of the solar panels; and
one or more upper support members each having a base for contacting the surface and an edge receiving area configured to receive an upper edge of a solar panel at the first height above the base, the upper support member not having any additional edge receiving area, the system in the installed configuration supporting a plurality of rows of solar panels, the upper support member supporting the upper edge of solar panels in a first row of the solar panels.

27. The system of claim 22, wherein:
each support member having a snap element adjacent one end and a receiving opening at an opposite end for connecting to the end of another support member so as to provide a generally continuous support member assembly.

28. The system of claim 22, wherein:
the system is for supporting the solar panels at an angle on a generally flat roof surface; and
the second height is significantly lower than the first height such that the solar panel is angled with respect to the roof surface under the support members.

29. A method for supporting a plurality of solar panels on a surface, the solar panels each having an upper edge, an opposed lower edge, and a pair of opposed side edges extending between the upper and lower edges, the solar panels being disposed in adjacent rows wherein the lower edge of one panel is adjacent the upper edge of another panel in an adjacent row, the method comprising:

providing a plurality of elongated support members each having:

a first edge and an opposed second edge extending longitudinally between a pair of opposed ends, each support member having an elongated first portion including the first edge and a coextensive elongated second portion including the second edge, each support member further having a longitudinally extending mid portion extending between and interconnecting the first and second portions;

the first portion having a base for contacting a surface and an edge receiving area configured to receive an upper edge of a solar panel at a first height above the base; and the second portion having a base for contacting the surface and an edge receiving area configured to receive a lower edge of a solar panel at a second height above the base, the second height being less than the first height;

the mid portion horizontally spacing the first portion from the second portion and having an exposed generally upwardly facing surface between the first and second portions, the generally upwardly facing surface being at a height offset from the edge receiving area of the first portion;

disposing a first one of the support members and a second one of the support members generally parallel to each other and spaced apart on the surface, the support members being positioned such that the first portion of the first one of the support members is directed toward the second portion of the second one of the support members;

receiving an upper edge of a solar panel in the edge receiving area of the first portion of the first one of the support members and a lower edge of the solar panel in the edge receiving area of the second portion of the second one of the support members.

30. The method of claim 29, wherein:
the surface is a generally flat roof having a roof membrane; and
the support system is self supporting and the method does not require anchoring to the roof, thereby avoiding penetrating the roof membrane.

* * * * *

UNITED STATES PATENT AND TRADEMARK OFFICE
CERTIFICATE OF CORRECTION

| | | |
|---|---|---|
| PATENT NO. | : 8,601,755 B2 | Page 1 of 1 |
| APPLICATION NO. | : 13/365629 | |
| DATED | : December 10, 2013 | |
| INVENTOR(S) | : Brian Bruce Clarkson et al. | |

It is certified that error appears in the above-identified patent and that said Letters Patent is hereby corrected as shown below:

In the Claims

Column 11, line 39, delete "foil" and insert --form--.

Signed and Sealed this
Twenty-second Day of April, 2014

Michelle K. Lee
*Deputy Director of the United States Patent and Trademark Office*